March 17, 1931.     S. ARDRON     1,796,700
MEAT BLOCK CLEANING MACHINE
Filed Jan. 21, 1929

INVENTOR
SAMUEL ARDRON
BY Hazard and Miller
ATTORNEYS

Patented Mar. 17, 1931

1,796,700

UNITED STATES PATENT OFFICE

SAMUEL ARDRON, OF LOS ANGELES, CALIFORNIA

MEAT-BLOCK-CLEANING MACHINE

Application filed January 21, 1929. Serial No. 333,916.

My invention is a meat block cleaning machine, adapted to mechanically scrub and scour wood meat blocks.

An object of my invention is a machine which may rest on a meat cutting block, such blocks being usually made of wood, the machine having a rotary brush driven by any suitable source of power and the machine being readily shiftable manually from one position to another on the block.

A more detailed object of my invention is a cleaning machine having a single rotary brush rotating on a horizontal axis, said brush having stiff bristles preferably made of metal and the machine having an electric motor connected to rotate the brush.

A further detailed object of my invention is having the machine partially supported by resiliently mounted pedestals so that most of the weight is taken by the brush and the pedestals steady the machine, the machine being shiftable on the cutting block manually.

My invention is illustrated in the accompanying drawings, in which.

Figure 1:
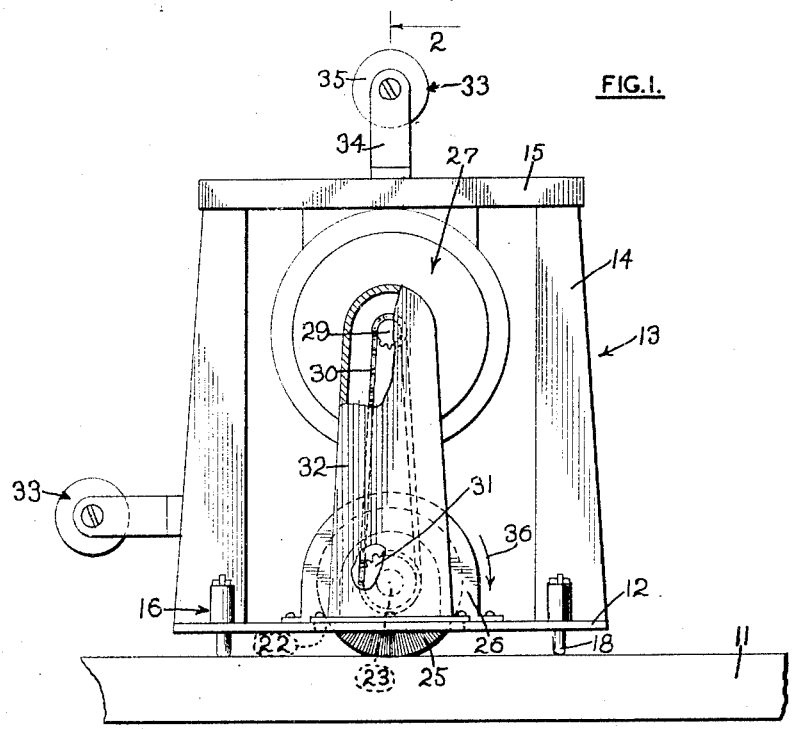
Figure 1 is an end elevation of my machine.
Figures 2, 3:
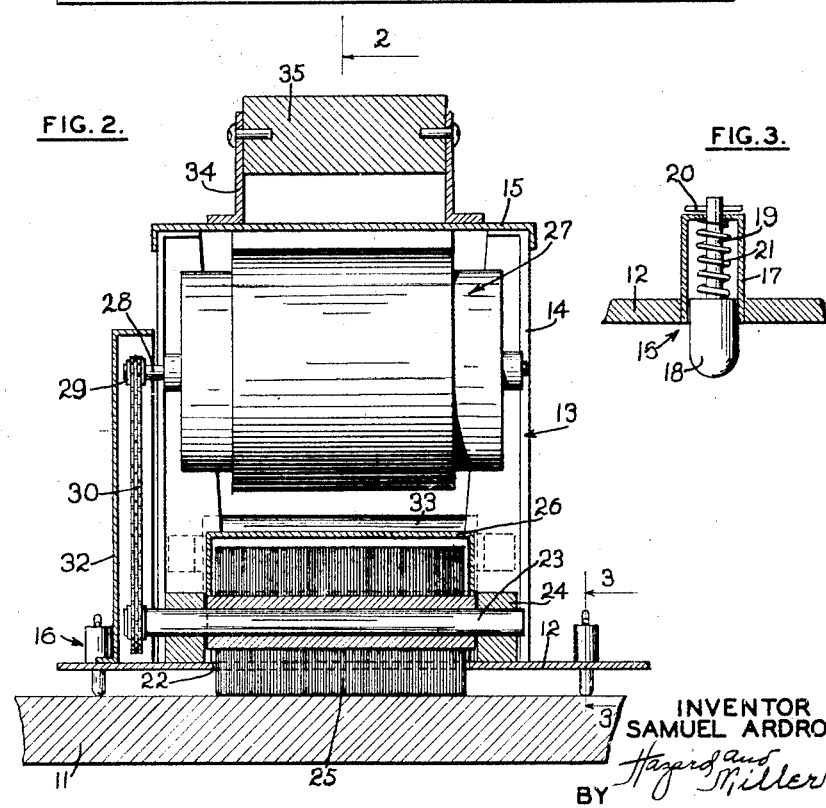
Fig. 2 is a vertical section taken on the line 2—2 of Fig. 1, in the direction of the arrows.
Fig. 3 is a detail section on the line 3—3 of Fig. 2 in the direction of the arrows.

In the drawings, the meat cutting block is indicated by the numeral 11. The cleaning machine has a base plate 12 with the frame 13 extending upwardly therefrom. This frame has legs 14 and a cap 15. A plurality of pedestals 16 (Fig. 3) are constructed by having a socket member 17 secured to the base plate and with the slidable pedestal members 18 fitting in these sockets. A stem 19 extends upwardly through a perforation in the socket and has a pin 20 restricting its outward movement. A compression coil spring 21 thrusts against the base of the socket and the pedestal member. The springs are of sufficient strength to support most of the weight of the cleaning machine.

The base plate has a large opening 22 and above this opening there is a shaft 23 mounted in journals 24 supported from the base plate. The shaft has a brush 25 mounted thereon, this brush having stiff bristles preferably formed of metal. A housing 26 encloses the upper part of the brush and the sides above the base plate.

An electric motor designated generally by the numeral 27 is mounted in the upper part of the frame and has a shaft 28. This shaft has a sprocket wheel 29 driving a sprocket chain 30. Such sprocket chain meshes with the sprocket 31 on the shaft 23 of the brush and hence drives the brush. A chain guard 32 is secured to the base and encloses the sprockets and the sprocket chain.

In order to shift the machine from one position to another, handles 33 are secured to the frame, these handles being illustrated as having brackets 34 secured to the legs 14 and to the cap 15 and having a hand grip 35. The electric wiring and connection for the motor is not shown as any suitable connection may be utilized.

It will be seen by this construction that the main weight of the cleaning machine rests on the bristles of the brush and that the pedestals keep this from tilting and also support part of the weight. The brush is designed to rotate in the direction of the arrows 36 which tends to draw the machine away from the operator, the operator being presumed to be on the side to grasp the side handle and also to grasp the upper handle when necessary. The operator may then guide the machine to different positions on the cutting block, the operator merely having to restrain the movement of the machine and he is not required to hold the brush above the block as this is taken care of by the brush itself and by the pedestals.

The machine may operate completely to the edge of the block as part of the frame may overlap and at the edge the operator may partly support the machine by the upper handle.

Various changes may be made in the principles of my invention without departing from the spirit thereof as set forth in the description, drawings and claim.

I claim:

A cleaning machine comprising in combination a base plate having an opening therein, a shaft journaled on the base plate and having a cylindrical brush mounted thereon, a lower part of the brush extending through the said opening, a housing attached to the base plate adjacent the opening and forming a covering for the upper part of the brush, a frame comprising a plurality of legs extending upwardly from the base and having a cap thereon, an electric motor mounted on the cap and means to drive the brush from the motor, the upper surface of the base plate being exposed, and means to resiliently support the base plate on the cutting block.

In testimony whereof I have signed my name to this specification.

SAMUEL ARDRON.